(12) United States Patent
Fukagawa et al.

(10) Patent No.: US 7,480,925 B2
(45) Date of Patent: Jan. 20, 2009

(54) OPTICAL DISC APPARATUS

(75) Inventors: Yoshihiro Fukagawa, Yokohama (JP);
Nozomu Harada, Kawasaki (JP)

(73) Assignee: Hitachi-Lg Data Storage, Inc., Tokyo (JP)

( * ) Notice: Subject to any disclaimer, the term of this patent is extended or adjusted under 35 U.S.C. 154(b) by 430 days.

(21) Appl. No.: 11/369,020

(22) Filed: Mar. 7, 2006

(65) Prior Publication Data

US 2007/0050801 A1    Mar. 1, 2007

(30) Foreign Application Priority Data

Aug. 23, 2005    (JP) .............................. 2005-241080

(51) Int. Cl.
*G11B 7/00*    (2006.01)
(52) U.S. Cl. .................................... 720/685
(58) Field of Classification Search ................ 720/685, 720/672, 684, 681, 683; 369/44.22, 44.16, 369/44.15, 244.1
See application file for complete search history.

(56) References Cited

U.S. PATENT DOCUMENTS 6,871,351 B2 *    3/2005    Yamauchi et al. ........... 720/671
7,137,130 B2 *    11/2006    Murata et al. ................ 720/649
7,342,849 B2 *    3/2008    Omori et al. .............. 369/44.14
2004/0208093 A1 *    10/2004    Omori et al. .............. 369/44.32
2005/0281142 A1 *    12/2005    Ochi et al. ................ 369/44.14
2006/0190955 A1 *    8/2006    Yeh et al. ..................... 720/679
2007/0186226 A1 *    8/2007    Omori et al. ................. 720/652
2008/0101200 A1 *    5/2008    Sato ....................... 369/112.01
2008/0104621 A1 *    5/2008    Takada ........................ 720/652

FOREIGN PATENT DOCUMENTS

JP    2005-038534    2/2005

OTHER PUBLICATIONS

Chinese Office Action, with English Translation, issued in Chinese Patent Application No. 200610072579.8, dated on Oct. 12, 2007.

* cited by examiner

*Primary Examiner*—Allen T Cao
(74) *Attorney, Agent, or Firm*—McDermott Will & Emery LLP

(57) ABSTRACT

In an optical disc apparatus, a metallic member forming an optical pickup, such as a bottom cover member of the optical pickup, has a protrusion in an integral form on the portion of the metallic member that is opposed to a plane of a flexible printed-wiring board, and the optical pickup is constructed so that when it comes into contact with an opposed face of the flexible printed-wiring board, the optical pickup brings a front end of the protrusion into contact with the opposed face.

11 Claims, 5 Drawing Sheets

OPTICAL DISC APPARATUS

CLAIM OF PRIORITY

The present application claims priority from Japanese application serial No. P2005-241080, filed on Aug. 23, 2005, the content of which is hereby incorporated by reference into this application.

BACKGROUND OF THE INVENTION

1. Technical Field of the Invention

The present invention relates to an optical disc apparatus in which an optical pickup and a main circuit board with a signal-processing circuit are interconnected via a flexible printed-wiring board. The invention relates more particularly to a technique for preventing the optical pickup and the flexible printed-wiring board from sticking to each other.

2. Description of the Related Art

The adoption of thinner optical disc apparatus structures in recent years has shortened the distance between an optical pickup and a flexible printed-wiring board which interconnects the main circuit board and the optical pickup. Accordingly, contact with the planar section of the optical pickup's bottom cover member and the flexible printed-wiring board is becoming prone to occur during movement of the optical pickup. Contact could result in the planar section of the optical pickup's bottom cover member and the flexible printed-wiring board sticking to each other. FIGS. 7A, 7B are explanatory diagrams of mutual sticking between an optical pickup 12' and a flexible printed-wiring board 17'. For a thin optical disc apparatus, the distance between the surface of the bottom cover member 12c' of an optical pickup 12' and the surface of the under cover 18' of a unit mechanical section is shortened to about $0.7 \times 10^{-3}$ m, for example, and the flexible printed-wiring board 17' with a thickness of about $0.2 \times 10^{-3}$ m, for example, is disposed in that space.

Movement of the optical pickup 12' in approximately the radial direction of an optical disc in that condition also moves the fold-back portion of the flexible printed-wiring board 17' and the associated portion of the optical pickup 12'. During the movement of the fold-back portion, the portion of the flexible printed-wiring board 17' that is located on the under cover 18' will change in position and easily move upward to leave the surface of the under cover 18'. If this actually occurs, the surface of the portion of the flexible printed-wiring board 17' that is located on the under cover 18' will come into contact with the surface of the bottom cover member 12c'. For example, if the bottom cover member 12c' is constructed of, for example, phosphor bronze to obtain the heat radiation property of the optical pickup 12' and has a smooth surface (with surface roughness less than $0.5 \times 10^{-6}$ m, for example), the above contact could result in the flexible printed-wiring board 17' and the bottom cover member 12c' sticking to each other, as shown in FIG. 7A. In the event of such sticking, the movement of the optical pickup 12' pulls and damages the flexible printed-wiring board 17' and/or increases the load applied to the optical pickup 12' during the movement. Phosphor bronze and other metallic materials with high heat-transfer characteristics are usually used as structural members in an as-rolled smooth surface condition. As shown in FIG. 7B, the increase in the load of the optical pickup 12' during the movement is prone to damage the portions $12b_1'$, $12b_2'$ of the optical pickup 12' that engage with a guide member 32'. In FIG. 7B, if the flexible printed-wiring board 17' and the bottom cover member 12c' stick to each other, load force $F_1$ or $F_2$ will be exerted on the effective central point P of a sticking region A, depending on the moving direction of the optical pickup 12', and the load force will work as a moment of arm length R upon the above-mentioned engagement portions $12b_1'$, $12b_2'$. This moment of arm length R is expected to damage or unusually wear out the respective bearings $12d'$ of the engagement portions $12b_1'$, $12b_2'$.

Conventional techniques related to the present invention and described in patent literature include the technique described in, for example, Japanese Patent Laid-Open No. 2005-38534. This Publication describes the technique that allows damage to the flexible circuit board of an optical disc apparatus to be prevented by providing a sliding-contact preventing member on the face of an optical pickup's housing that is directed to the flexible circuit board, and reliably maintaining the interval between the above face and the face of the flexible circuit board that is directed to the housing of the optical pickup. The use of this technique prevents the face of the housing from abrading the face of the flexible circuit board. This conventional technique described in the above Publication, however, is intended only to prevent damage to the flexible circuit board (flexible printed-wiring board) due to abrasion during movement of the optical pickup. Neither a suppression effect against increases in the movement load of the optical pickup due to mutual sticking between the flexible circuit board and the optical pickup, nor a prevention effect against unusual wear on or damage to the portions that engage with a guide member can be obtained using the above conventional technique. In addition, there is a need to install a sliding-contact preventing member on or in the housing of the optical pickup.

The present invention has been made with the above situation of the conventional technique taken into account. An optical pickup in an optical disc apparatus of the invention is constructed such that while maintaining a heat radiation property under a simplified configuration not increasing the number of parts required, the optical pickup prevents mutual sticking between a flexible printed-wiring board and the optical pickup itself, and hence, damage to the flexible printed-wiring board. The optical pickup is also adapted to suppress increases in a movement load of the optical pickup and prevent unusual wear on or damage to the portions that engage with a guide member.

An objective of the present invention is to provide an optical disc apparatus that solves the problem hereinbefore mentioned and improves reliability of the apparatus.

SUMMARY OF THE INVENTION

The present invention is a technique freed of the above problem.

That is to say, in an optical disc apparatus of the invention, a metallic member forming an optical pickup, such as a bottom cover member thereof, has a protrusion in an integral form on the portion of the metallic member that is opposed to a plane of a flexible printed-wiring board. In addition, the optical pickup is constructed so that when it comes into contact with an opposed face of the flexible printed-wiring board, the optical pickup brings a front end of the protrusion into contact with the opposed face. In addition, the optical pickup ranges from about $0.5 \times 10^{-6}$ m to about $20.0 \times 10^{-6}$ m in terms of surface roughness in a plane of a member serving as a constituent element of the optical pickup, the plane being opposed to the flexible printed-wiring board.

According to the present invention, it is possible to prevent a flexible printed-wiring board and optical pickup in an optical disc apparatus from sticking to each other, and thus to improve reliability of the apparatus.

DETAILED DESCRIPTION OF THE PREFERRED EMBODIMENTS

Embodiments of the present invention will be described hereunder using the accompanying drawings.

Figure 1:
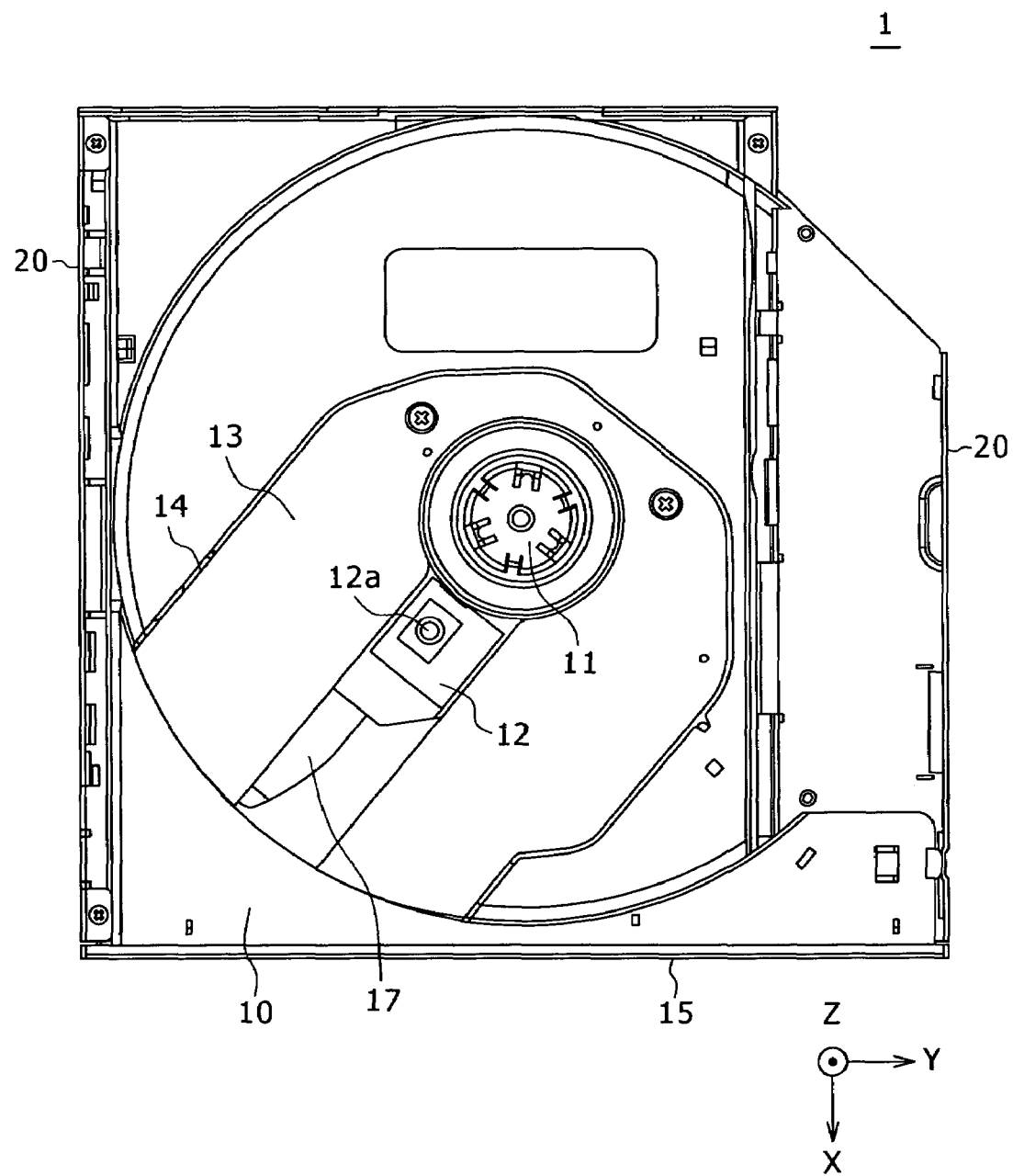
FIG. 1 is a structural view showing an example of an optical disc apparatus which is a first embodiment of the present invention.
Figure 2:
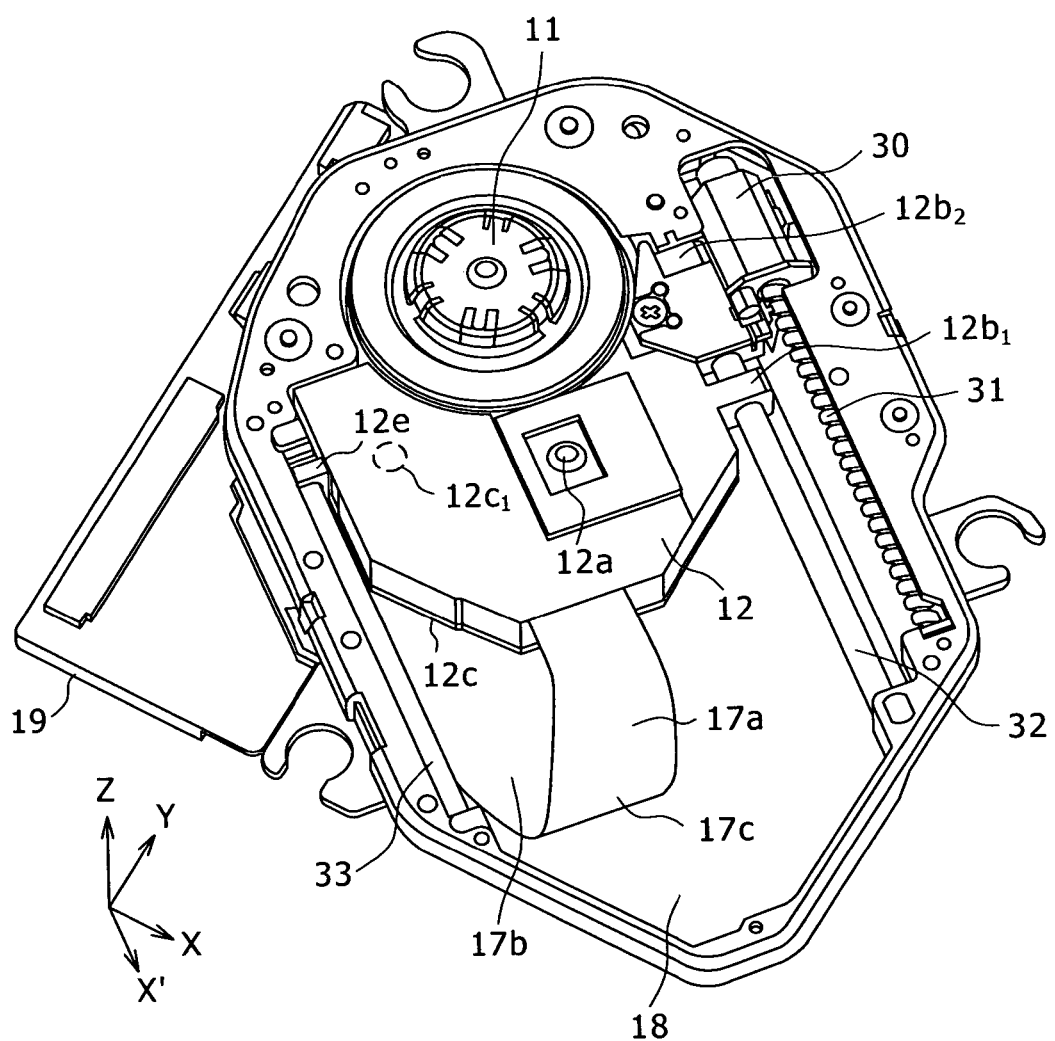
FIG. 2 is a structural view showing a unit mechanical section of the optical disc apparatus shown in FIG. 1.
Figure 3:
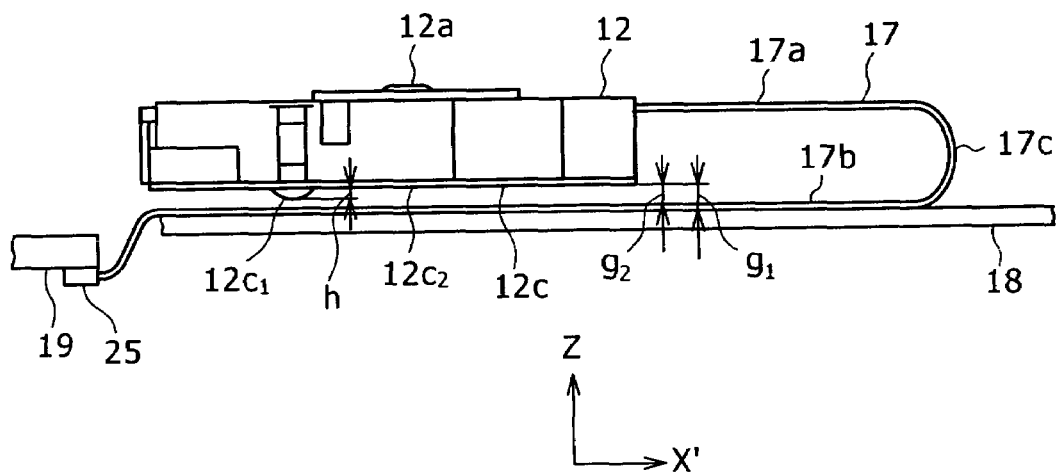
FIG. 3 is a view showing a lateral structure of an optical pickup and flexible printed-wiring board in the unit mechanical section of FIG. 2.
Figure 4:
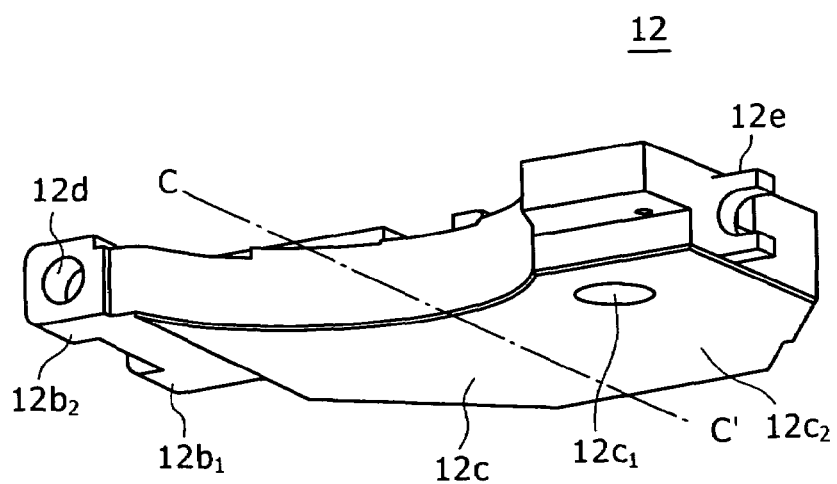
FIG. 4 is an external view of the optical pickup in the optical disc apparatus of FIG. 1.
Figure 5:
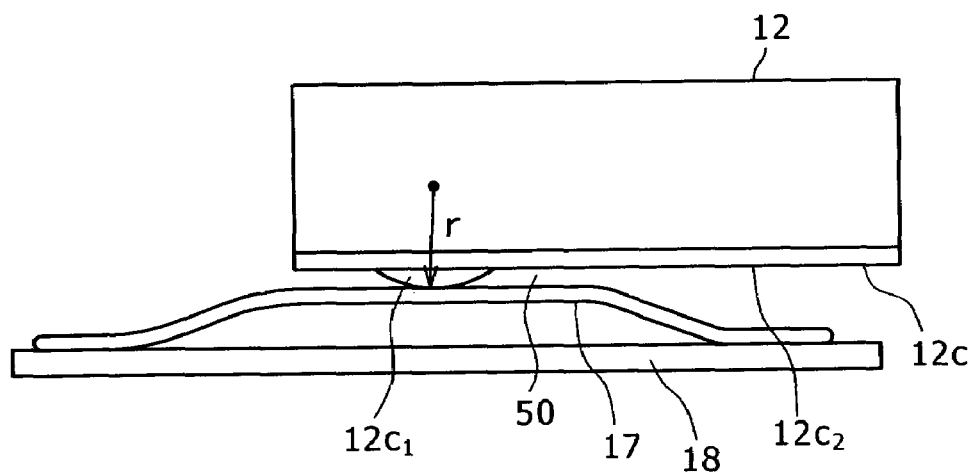
FIG. 5 is an explanatory diagram of a protrusion provided on the optical pickup of the optical disc apparatus shown in FIG. 1.

FIGS. 1 to 5 are explanatory diagrams concerning a first embodiment of the present invention. FIG. 1 is a structural view showing an example of an optical disc apparatus which is a first embodiment. FIG. 2 is a structural view showing a unit mechanical section within the optical disc apparatus of FIG. 1. FIG. 3 is a view showing a lateral structure of an optical pickup and flexible printed-wiring board in the unit mechanical section of FIG. 2. FIG. 4 is an external view of the optical pickup in the optical disc apparatus of FIG. 1. FIG. 5 is an explanatory diagram of a protrusion provided on a bottom cover member of the optical pickup in the optical disc apparatus of FIG. 1. The present first embodiment applies when one protrusion is provided. The same constituent elements of the optical disc apparatus on the accompanying drawings are each assigned the same reference number or symbol.

Reference number 1 in FIG. 1 denotes the optical disc apparatus, 10 a tray on which to rest the optical disc (not shown) and used to load the disc into or unload it from a main unit of the apparatus, and 11 a disc motor that rotationally drives the optical disc. Reference number 12 denotes the optical pickup that records information on or reproduces information from the optical disc while moving in a radial direction thereof, and 12a an objective lens inside the optical pickup. Reference number 13 denotes a cover member, 14 the unit mechanical section on which are mounted the disc motor 11, the optical pickup 12, a moving unit (not shown) for moving the optical pickup, and other sections. Reference number 15 denotes a front panel, 20 a bottom casing that covers the underside (in FIG. 1, reverse side) of the apparatus, and 17 the flexible printed-wiring board that interconnects the optical pickup 12 and a main circuit board (not shown). The unit mechanical section 14 is coupled with a required section of the tray 10 and can be moved therewith in both plus and minus directions of an X-axis.

Reference number 30 in the unit mechanical section 14 of FIG. 2 denotes a sliding motor, and 31 a lead screw which, when rotationally driven by the sliding motor 30, moves the optical pickup 12 in approximately the radial direction of the optical disc. Reference numbers 32, 33 each denote a guide member that guides the movement of the optical pickup 12, and $12b_1$, $12b_2$ denote the engagement portions of the optical pickup 12 that engage with the guide member 32. Reference number 12e denotes the engagement portion of the optical pickup 12 that engages with the guide member 33, 18 an under cover, 19 the main circuit board, 17a the portion of the flexible printed-wiring board 17 that faces the optical pickup 12, and 17b the portion of the flexible printed-wiring board 17 that faces the main circuit board 19 (the portion 17b is located on the under cover 18). Reference number 17c indicates a fold-back portion of the flexible printed-wiring board 17, 12c the bottom cover member that covers the bottom of the optical pickup 12, and $12c_1$ the protrusion formed in a planar section of the bottom cover member 12c. Other reference numbers or symbols denote the same as for FIG. 1. In order to release the heat generated by a laser diode (not shown) inside the optical pickup 12, the bottom cover member 12c is constructed using a metallic material having a high heat-transfer property, that is, having a heat conductivity of at least about 50 W/(m·K) [approx. 0.12 cal/(cm·sec·° C.)]. This metallic material is, for example, phosphor bronze with a heat conductivity ranging from about 50 W/(m·K) to about 80 W/(m·K) [approx. 0.12 cal/(cm·sec·° C.) to approx. 0.19 cal/(cm·sec·° C.)]. The protrusion $12c_1$ is formed integrally with the bottom cover member 12c and protrudes in an opposed fashion with respect to a plane of the portion 17b of the flexible printed-wiring board 17 that faces the main circuit board 19. When the optical pickup 12 comes into contact with an opposed face of the flexible printed-wiring board 17, that is, the plane of the portion 17b of the flexible printed-wiring board 17 that faces the main circuit board 19, the optical pickup brings a front end of the protrusion $12c_1$ into contact with that plane. Height of the protrusion $12c_1$ above a planar position of the bottom cover member 12c ranges from about $0.05 \times 10^{-3}$ to $0.20 \times 10^{-3}$ m, and a curvature radius of a curved face of the protrusion at the front end thereof ranges from about $0.5 \times 10^{-3}$ to $40.0 \times 10^{-3}$ m. It is experimentally confirmed by the present inventor that when these values are assigned, a space for preventing a sticking event without causing the front end of the protrusion $12c_1$ to damage the plane of the flexible printed-wiring board 17, even if the protrusion $12_{c1}$ comes into contact with this plane during the movement of the optical pickup 12, can be reliably formed around the protrusion $12c_1$. Since this prevents mutual sticking between the plane of the flexible printed-wiring board 17 and the bottom cover member 12c formed of phosphor bronze or any other highly heat-conductive material with a heat conductivity of at least about 50 W/(m·K) [approx. 0.12 cal/(cm·sec·° C.)], damage to the flexible printed-wiring board 17 is prevented with a heat radiation property of the optical pickup 12 being maintained. Increases in a movement load of the optical pickup 12 are also suppressed and this, in turn, prevents the occurrence of unusual events such as abnormal wear on bearings of the engagement portions $12b_1$, $12b_2$ of the optical pickup 12.

FIG. 3 is a view showing a lateral structure of the optical pickup 12 and flexible printed-wiring board 17 in the unit mechanical section 14 of FIG. 2.

Reference number $12c_2$ in FIG. 3 denotes the planar section of the bottom cover member 12c, and 25 a connector to which the flexible printed-wiring board 17 is connected on the main circuit board 19. Symbol "h" denotes the height of the protrusion $12c_1$ above the planar section $12c_2$ of the bottom cover member 12c, "$g_1$" a distance from the planar section $12c_2$ of the bottom cover member 12c to the under cover 18, and "$g_2$" a distance from the planar section $12c_2$ of the bottom cover member 12c to the flexible printed-wiring board 17. Other reference numbers or symbols denote the same as for FIG. 2. In FIG. 3, for example, "h" takes a value ranging from about $0.05 \times 10^{-3}$ to $0.20 \times 10^{-3}$ m, "$g_1$" takes a value of about 0.7×

$10^{-3}$, and "$g_2$" takes a value of about $0.5 \times 10^{-3}$ m. When the optical pickup 12 moves in a plus or minus direction of X' (approximately the radial direction of the optical disc), the fold-back portion 17c of the flexible printed-wiring board 17 connected to the optical pickup, and the portion 17a closer to the optical pickup than to the fold-back portion 17c, also move together. As these movements are started, the portion 17b of the flexible printed-wiring board 17 that faces the main circuit board 19 moves upward to leave the surface of the under cover 18, thus changing in position, and coming into contact with the optical pickup 12. When the portion 17b of the flexible printed-wiring board 17 comes into contact with the optical pickup 12, the portion 17b comes into contact with the front end of the protrusion $12c_1$ of the bottom cover member 12c, hence preventing contact with the planar section $12c_2$ of the bottom cover member 12c. In other words, a spatial portion is formed between the planar section $12c_2$ and the surface of the flexible printed-wiring board 17, around the protrusion $12c_1$, and the planar section $12c_2$ and the surface of the flexible printed-wiring board 17 are prevented from sticking to each other. If the portion 17b of the flexible printed-wiring board 17 that faces the main circuit board 19 originally has any warpage, the effect obtained is the same as obtained if the portion 17b moves upward and leaves the surface of the under cover 18. Since sticking is prevented in this way, increases in the load of the optical pickup 12 during the movement thereof are suppressed and this prevents unusual bearing wear and bearing damage at the engagement portions $12b_1$, $12b_2$ of the optical pickup 12 that engage with the guide member 32. Damage to the surface of the flexible printed-wiring board 17 is also prevented.

FIG. 4 is an external view of the optical pickup 12.

Reference number 12d in FIG. 4 denotes the bearing section disposed in the engagement portions $12b_1$, $12b_2$ of the optical pickup 12. FIG. 4 assumes that the bottom cover member 12c is originally provided to shroud the bottom of the optical pickup 12. The section corresponding to approximately a central section of the flexible printed-wiring board 17 in a lateral direction thereof, at a position opposed to the surface of the wiring board 17 in the plane of the bottom cover member 12c, is subjected to a process such as drawing to form the protrusion $12c_1$ integrally with the bottom cover member 12c. Thus, the protrusion $12c_1$ can be easily formed without increasing the number of parts required. In the optical disc apparatus 1 of the present first embodiment, since the flexible printed-wiring board 17 is disposed closer to the engagement portion 12e of the optical pickup 12 than to a center line C-C' thereof, the protrusion $12c_1$ is provided at the side distant from the engagement portions $12b_1$, $12b_2$ of the optical pickup 12, in the plane of the bottom cover member 12c. The protrusion $12c_1$, however, does not have its position limited by the first embodiment and may be provided at any other position where mutual sticking between the bottom cover member 12c and the flexible printed-wiring board 17 can be prevented.

FIG. 5 is an explanatory diagram of the protrusion $12c_1$ provided on the bottom cover member 12c.

In FIG. 5, the curved face of the protrusion $12c_1$ at the front end thereof ranges from about $0.5 \times 10^{-3}$ to $40.0 \times 10^{-3}$ m in curvature radius "r". During the movement of the optical pickup 12, the flexible printed-wiring board 17 is brought into contact with the optical pickup 12 for reasons such as the original warpage of the wiring board 17 or the partial upward movement thereof due to the tensile force caused by the movement of the optical pickup. Accordingly, the front end of the protrusion $12c_1$ on the bottom cover member 12c comes into contact with the flexible printed-wiring board 17, while a spatial portion 50 is formed between the planar section $12c_2$ and the surface of the flexible printed-wiring board 17, around the protrusion $12c_1$. The planar section $12c_2$ and the surface of the flexible printed-wiring board 17 are consequently prevented from sticking to each other. Contact of the front end of the protrusion $12c_1$ with the surface of the flexible printed-wiring board 17 occurs with a contact area associated with a magnitude of the curvature radius "r" of the protrusion's curved surface, and thus, increases in the movement load of the optical pickup 12 are suppressed.

According to the above first embodiment, mutual sticking between the flexible printed-wiring board 17 and the optical pickup 12 can be prevented in the optical disc apparatus 1. Since such sticking can be prevented, it is possible to prevent damage to the flexible printed-wiring board 17 and to suppress increases in the load of the moving optical pickup 12. Accordingly, unusual wear on and damage to the engagement portions $12b_1$, $12b_2$ of the optical pickup 12 that engage with the guide member 32 can be prevented, which holds true particularly for the bearing section disposed in engagement portions $12b_1$, $12b_2$. The reliability of the apparatus can be improved as a result. A significant advantageous effect that includes improved heat radiation property of the optical pickup 12 can be obtained, especially when a highly heat-conductive material with a smooth surface, such as phosphor bronze, is used as the bottom cover member 12c.

Figure 6:
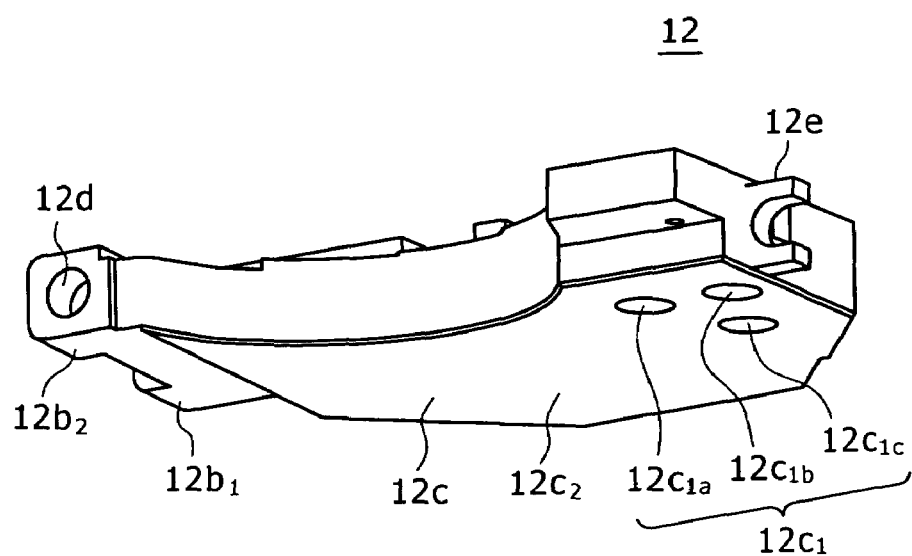
FIG. 6 is an explanatory diagram of a second embodiment of the present invention.
Figure 7A:
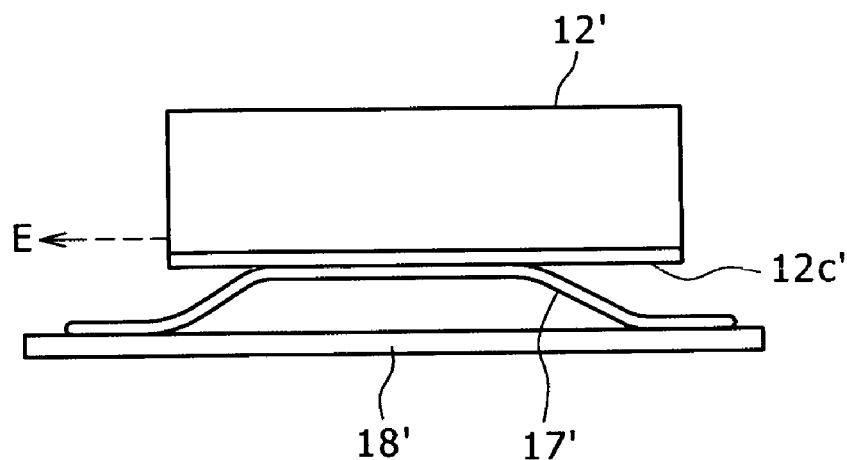
FIGS. 7A, 7B are explanatory diagrams pertaining to the problem that the present invention is to solve.
Figure 7B:
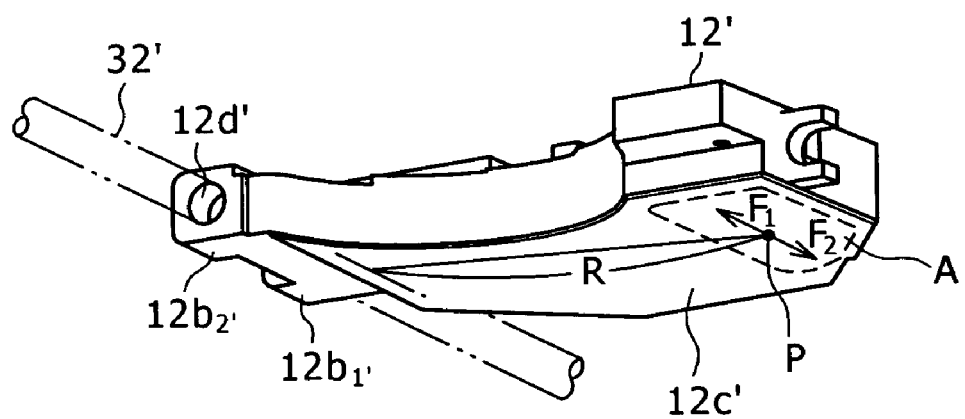

FIG. 6 is an explanatory diagram of a second embodiment of the present invention, showing an example of a construction of an optical pickup 12 in the second embodiment. The construction of the optical pickup 12 in the present embodiment assumes that a protruding portion $12c_1$ of a bottom cover member 12c is formed up of a plurality of protrusions.

Reference numbers $12c_{1a}$, $12c_{1b}$, $12c_{1c}$ in FIG. 6 denote the protrusions constituting the protruding portion $12c_1$. FIG. 6 also assumes that respective heights of the protrusions $12c_{1a}$, $12c_{1b}$, $12c_{1c}$ above a planar position of the bottom cover member 12c range from about $0.05 \times 10^{-3}$ to $0.20 \times 10^{-3}$ m and that a curvature radius of a curved face of each protrusion at a front end thereof ranges from about $0.5 \times 10^{-3}$ to $40.0 \times 10^{-3}$ m. All the protrusions $12c_{1a}$, $12c_{1b}$, $12c_{1c}$ may be of approximately the same height and same curvature radius, or part or all of the protrusions may differ from one another in the height and the curvature radius. In addition, operation of the protrusion $12c_{1a}$, $12c_{1b}$, $12c_{1c}$ is the same as for the protrusion $12c_1$ in the first embodiment hereinbefore described.

Essentially the same effect as in the first embodiment can also be obtained in the second embodiment.

While the second embodiment assumes three protrusions, this number does not limit the present invention and an actual number of protrusions can be two or more. In addition, while the second embodiment assumes that the protrusions are provided on the bottom cover member 12c of the optical pickup 12, this arrangement of the protrusions is not restrictive and protrusions integrated with, for example, the body, heat radiation plate, shielding plate, or any other cover member forming the optical pickup 12, may be formed thereon. Furthermore, the curved face of each protrusion at the front end thereof may have the same curvature in all directions or may have a different curvature according to a particular direction. Moreover, in terms of total shape, the protrusions need only to have a specific curved face at a front end, and the total shape is not limited. Besides, when the bottom cover member 12c of the optical pickup 12 can be reduced in heat radiation property, a metallic material such as stainless steel may be used as the bottom cover member 12c.

Additionally, although the first and second embodiments assume a construction with a protrusion(s) on the member of the optical pickup 12, such as the bottom cover member 12c, that is opposed to the flexible printed-wiring board 17, mutual sticking between the bottom cover member 12c of the optical pickup 12 and the flexible printed-wiring board 17 can likewise be prevented if a plane of any other constituent member of the optical pickup that is opposed to the flexible printed-wiring board is constructed so as to stay within a surface roughness range from about $0.5 \times 10^{-6}$ m to about $20.0 \times 10^{-6}$ m. This, in turn, makes it possible to prevent damage to the wiring board 17 and to suppress increases in the load of the optical pickup 12 during the movement thereof and to prevent unusual wear on and damage to the bearing section 12d in the engagement portions $12b_1$, $12b_2$ of the optical pickup 12 that engage with the guide member 32. Consequently, the reliability of the apparatus can be improved. In this case, an excellent heat radiation property of the optical pickup 12 is likewise ensured if a metallic material with a heat conductivity of at least about 50 W/(m·K) [approx. 0.12 cal/(cm·sec·° C.)], such as phosphor bronze, is used as the bottom cover member 12c or any other member opposed to the flexible printed-wiring board 17.

The present invention can be embodied in other specific forms without departing from the spirit or essential characteristics thereof. The invention is therefore not to be considered in all respects as illustrative and not restrictive, the scope of the invention being indicated by the appended claims rather than by the foregoing description, and all modifications and changes that come within the meaning and range of equivalency of the claims are therefore intended to be embraced therein.

What is claimed is:

1. An optical disc apparatus in which an optical pickup and a circuit board with a signal-processing circuit are interconnected via a flexible printed-wiring board, wherein:
   the optical pickup comprises, in a plane being opposed to the flexible printed-wiring board of a metallic member, a protrusion formed integrally with the metallic member serving as a constituent element of the optical pickup; and
   the optical pickup is constructed such that when it comes into contact with an opposed face of the flexible printed-wiring board, the optical pickup brings a front end of the protrusion into contact with the opposed face of the flexible printed-wiring board.

2. The optical disc apparatus according to claim 1, wherein the metallic member is a cover member that covers the bottom of the optical pickup, and wherein the protrusion is adapted to be formed integrally with the cover member in a plane thereof.

3. The optical disc apparatus according to claim 1, wherein the protrusion is adapted to range from about $0.5 \times 10^{-3}$ m to about $40.0 \times 10^{-3}$ m in terms of curvature radius of a curved face at the front end of the protrusion.

4. The optical disc apparatus according to claim 2, wherein the protrusion is adapted to range from about $0.5 \times 10^{-3}$ m to about $40.0 \times 10^{-3}$ m in terms of curvature radius of a curved face at the front end of the protrusion.

5. The optical disc apparatus according to claim 1, wherein the protrusion is adapted to have a height ranging from about $0.05 \times 10^{-3}$ m to about $0.20 \times 10^{-3}$ m.

6. The optical disc apparatus according to claim 2, wherein the protrusion is adapted to have a height ranging from about $0.05 \times 10^{-3}$ m to about $0.20 \times 10^{-3}$ m.

7. The optical disc apparatus according to claim 3, wherein the protrusion is adapted to have a height ranging from about $0.05 \times 10^{-3}$ m to about $0.20 \times 10^{-3}$ m.

8. The optical disc apparatus according to claim 1, wherein the metallic member is formed of a material whose heat conductivity ranges from about 50 W/(m·K) to about 80 W/(m·K).

9. The optical disc apparatus according to claim 2, wherein the metallic member is formed of a material whose heat conductivity ranges from about 50 W/(m·K) to about 80 W/(m·K).

10. The optical disc apparatus according to claim 3, wherein the metallic member is formed of a material whose heat conductivity ranges from about 50 W/(m·K) to about 80 W/(m·K).

11. An optical disc apparatus in which an optical pickup and a circuit board with a signal-processing circuit are interconnected via a flexible printed-wiring board, wherein:
    the optical pickup ranges from about $0.5 \times 10^{-6}$ m to about $20.0 \times 10^{-6}$ m in terms of surface roughness in a plane of a member serving as a constituent element of the optical pickup, the plane being opposed to the flexible printed-wiring board; and
    the optical pickup is constructed such that when it comes into contact with an opposed face of the flexible printed-wiring board, the optical pickup brings the plane of the member into contact with the opposed face of the flexible printed-wiring board.

* * * * *